United States Patent [19]
Lightle et al.

[11] 4,382,606
[45] May 10, 1983

[54] SPRAY CONTROLLING SYSTEM AND SPLASH GUARD FOR AUTOMOTIVE VEHICLES

[75] Inventors: Robert E. Lightle; James R. Lockwood, both of Wapakoneta; Douglas F. Busch; Michael B. Mosholder, both of Columbus, all of Ohio

[73] Assignee: Lancaster Colony Corporation, Columbus, Ohio

[21] Appl. No.: 230,332

[22] Filed: Feb. 2, 1981

[51] Int. Cl.³ .......................................... B62D 25/016
[52] U.S. Cl. ........................ 280/154.5 R; 280/152 R; 280/153 R; D12/185
[58] Field of Search ............... 280/154.5 R, 152 R, 280/153 R, 154.5 A; D12/185, 186

[56] References Cited
U.S. PATENT DOCUMENTS

| | | | |
|---|---|---|---|
| 1,904,343 | 4/1933 | Zaiger et al. | 280/154.5 R |
| 3,195,920 | 7/1965 | Knisely et al. | 280/154.5 R |
| 3,497,238 | 2/1970 | Carlton | 280/154.5 R |
| 3,866,943 | 2/1975 | Innis | 280/154.5 R |

FOREIGN PATENT DOCUMENTS

| | | | |
|---|---|---|---|
| 1101143 | 1/1968 | United Kingdom | 280/154.5 R |
| 2035932 | 1/1980 | United Kingdom | 280/154.5 R |

*Primary Examiner*—Joseph F. Peters, Jr.
*Assistant Examiner*—Mitchell J. Hill
*Attorney, Agent, or Firm*—Robert E. Stebens

[57] ABSTRACT

A spray controlling system is provided for vehicles that includes, for a wheel-set, a splash guard and a side shield positioned at the rear and side of a wheel set, respectively. The guard comprises a panel having a plurality of rows of conical projections and a plurality of upstanding ribs formed on a wheel-facing surface thereof in a spaced parallel relationship. Both projections and ribs are disposed in an inverted-V configuration oriented on a vertical centerline of the panel with six rows of projections interposed between adjacent ribs. The projections are disposed closely adjacent in the rows to form water flow channels between rows and ribs with the ribs being about twice the height of the projections. Vertically extending flanges are formed at each side of the panel in outwardly spaced relationship to the ends of the rows of projections and ribs forming channels to divert outwardly and downwardly flowing water from the ribs and projections for discharge in relatively large streams downwardly toward the roadway. Each side shield is of a length to extend forwardly from the splash guard to a point forward of the front of the wheel-set and a vertical height to extend downwardly from the vehicle body to a point below the top of the wheel. Each shield comprises a panel having an inwardly facing surface provided with a plurality of vertically extending, spaced parallel ribs for directing air and water flow downwardly at the side of the wheel set.

54 Claims, 14 Drawing Figures

SPRAY CONTROLLING SYSTEM AND SPLASH GUARD FOR AUTOMOTIVE VEHICLES

FIELD OF THE INVENTION

This invention relates to guards and barrier devices adapted for utilization with automotive vehicles for effecting control of water spray produced by the vehicles' wheels when transversing a roadway covered with water whether in thin films or puddles. It relates more specifically to a splash guard or mud guard that is adapted to be suspended in generally vertical orientation and disposed rearwardly of the vehicles' wheels to intercept the water spray that may be thrown upwardly and rearwardly by the wheel. It also relates to a spray controlling system which includes such a splash guard and side guards that are suspended in vertically oriented relationship longitudinally of the vehicle and outwardly of the wheel at the upper portions thereof. Such systems combine in their effect to control air flow and the water particles entrained therein, either as large droplets or a fine mist, in directions both laterally outward with respect to the vehicle and rearwardly.

BACKGROUND OF THE INVENTION

The problem to which this invention is directed is the blinding spray of water that is generated by large, fast moving vehicles, such as large trucks, and which spray presents a serious driving hazard to adjacent and following vehicles. Depending upon the density of the water layer on the roadway, this spray, at times, may become so intense and heavy and its dispersement such that it is thrown onto the windshields of following vehicles in a sufficient density that driving visibility may, at times, be reduced to nearly zero. Similarly, spray is thrown laterally of the wheels of a truck-type vehicle, particularly those of the tandem or dual tandem drive or trailer wheel, and a similar problem is developed with respect to passing vehicles or vehicles travelling in an adjacent lane. The wheels of trucks are of a sufficient vertical extent that water is thrown laterally from the top of those wheels and is thus essentially coincident with the height of passenger car windshields and accordingly produce a serious hazard in the form of greatly reduced visibility, particularly as to passenger vehicles.

This problem has been previously recognized and attempts have been made to provide a solution to control that spray and its dispersement. An example of a combination of side guard and rear mud flap or splash guard devices is illustrated in U.S. Pat. No. 3,721,459 granted to H. L. Lea on Mar. 20, 1973. That patent illustrates the basic combination of a vertically suspended mud guard which extends transversely with respect to the vehicle and is disposed a distance rearwardly of the vehicle wheels. Also, that patent discloses use of a side guard which comprises an elongated panel supported at the side of the vehicle and extending longitudinally with respect thereto. This panel is of a vertical height to extend downwardly from the trailer body and project slightly below the top portion of the vehicle wheels. The length is of an extent such that it begins a distance forwardly of the wheels and terminates rearwardly and may cooperatively engage with the transverse mud flap to form a closed upper chamber between those two elements and the trailer body. While the device as shown in U.S. Pat. No. 3,721,459 achieved a certain degree of success in its general objectives, that structure has not proven to be as fully satisfactory and effective as is desired. One of the problems of such a mud flap and side guard system is that the mud flap comprises a flat surfaced sheet of material that is flexible for performance reasons and because of manufacturing expedience, and comprises a smooth surface facing the rear wheels of the vehicle. The spary that is generated comprises water droplets and a fine mist that is thrown against this smooth surface and, as a partial consequence of air flow, will remain entrained in that air flow and be dispersed laterally with respect to the flap as well as having a portion thereof collected and directed downwardly to drain off the bottom of the flap and fall to the roadway.

In view of the general deficiencies and limitations of the spray system and splash guard as shown in U.S. Pat. No. 3,721,459, attempts have been made to improve at least the splash guards to reduce the airborne flow of water droplets and spray by attempting to collect the droplets and spray mist on the surface of the splash guard and direct such collected water, in a sheet form, downwardly and transversely across the guard where it will be discharged toward the surface of the roadway. An example of such an attempt is illustrated in U.S. Pat. No. 2,714,015 granted to C. E. Sherman on July 26, 1955. That patent illustrates a guard which has integrally formed on a front surface thereof, a plurality of upstanding ribs disposed in angled relationship and in combination with vertically extending ribs at each side of the guard. The objective of this arrangement of ribs was to collect the water that is thrown against the surface of the guard in the form of either relatively large droplets or a spray mist and, with that water which is then formed as a sheet or thin film of water, to direct its flow transversely of the guard. With the ribs oriented in a downwardly inclined relationship to the center of the guard and from each side as disclosed in that patent, the water will be caused to flow toward the center of the guard where it will then flow downwardly and discharge from the bottom edge. In the cas of a single wheel, that water was then caused to flow downwardly and deposited or discharged directly in the rear of a single wheel type axle. In the cas of a dual wheeled axle, the water would then have been deposited and discharged at a point which was aligned with the space between the two wheels.

Another example of a splash guard designed to control the flow of water that is collected on the surface of the guard is illustrated in U.S. Pat. No. 3,929,352 issued to Knut Arenhold on Dec. 30, 1975. That patent illustrates a guard having a vertically extending flange along one side and a plurality of upstanding ribs extending transversely from that side flange completely across the guard and terminating at the opposite edge which is not provided with a vertical flange. These ribes were intended to perform the function of directing and channelling water flow transversely across the entire width of a guard and, to enhance their performance, these ribs were arcuately curved to better enable them to retain the water and perform this channelling function. A disadvantage of this arrangement is that in the case of a dual wheel or tandem wheel arrangement, the width of the guard is of such an extent that the relatively small heighth ribs are incapable of retaining the water for directing its complete flow across the entire splash guard.

A further example of rib structures formed on splash guards and designed to achieve the same general objectives of the two previously cited U.S. patents is that disclosed in U.S. Pat. No. 3,198,545 granted to H. R. McDaniel on Aug. 3, 1965. That splash guard is constructed with an arcuate configuration to conform generally to the curvature of the vehicle wheel, and thus, the surface is disposed at a constant distance relative to the wheel surface. Additionally, the guard is provided on its forwardly facing surface adjacent to the wheel with a plurality of complex rib elements which have a function of attempting to collect water spray that is thrown upwardly by the wheel and to direct or channel the water that is thus collected on the surface of the guard in a downward direction where it may be discharged to the roadway. Again, this structure is of the same general type as that shown in the two previously noted U.S. patents wherein the only water collecting elements are the flow directing ribs, otherwise, the face of the guard is of a generally smooth nature and as a consequence, water droplets or spray thrown against the surface have a substantial tendency to rebound and are thus not collected on that surface. A structure designed to obviate that disadvantage is illustrated in United Kingdom Patent Application Ser. No. GB 2004823 filed Oct. 9, 1978. The structure shown in that patent application comprises a guard having a surface formed with a series of recesses or channels with the openings thereto designed to restrict outflow of water. Consequently, water droplets thrown into the recess or a spray mist that drifts into those recesses will be more likely retained in the channels and then caused to flow downwardly and be discharged from the bottom of the guard toward the roadway.

This problem associated with the generation of entrained water droplets and a fine mist as a consequence of the high speed of revolution of the vehicle wheels was further recognized in U.S. Pat. No. 3,899,192 granted to Walter W. Reddaway on Aug. 12, 1975. In this patent, W. W. Reddaway proposed a solution to this entrained spray problem in the form of splash guards and surface treatments of the body of the tractor and trailer comprising sheets of material having a surface provided with a multiplicity of filamentary-type fingers. In general, that surface may be characterized as an artificial turf in which those filamentary fingers that can be advantageously and economically formed from suitable plastic materials are extremely flexible and disposed in a random and sometimes intertwined relationship. The function of that surface is to receive the air entrained water and to collect that water that should impinge upon the surface of the guard. The collection efficiency of this guard is based on the concept that the multiplicity of flexible and intertwined filamentary fingers will permit penetration of the water droplets as well as a mist type spray and as a consequence of its impedance to air flow, will result in those particles of water being collected on the surface of the guard at the base of the filaments or within the interstices of adjacent filaments. Water that is collected may then flow downwardly and be discharged from the bottom edge of the guard.

Further recognition of this significant problem of collecting the water on the surface of a guard is demonstrated in British Pat. No. 1,101,143 which was filed Jan. 20, 1965. The structure proposed in that patent comprised a sheet form panel having vertically extending flanges at each side and a plurality of fingers or projections which extend outwardly from the surface. These projections which are a finger-like conical configuration are designed and dimensioned such that each conical projection is relatively spaced to all other adjacent fingers by a distance which is at least of the order of the base diameter of the projection. Thus, each of the fingers is relatively independent with respect to the others and a surface remains on the face of the guard panel for substantially uninhibited flow of collected water downwardly over that surface. With these fingers thus spaced, there is not sufficient impedance to flow to result in any directional control as to the water flow across the face of the panel, and consequently, water that is collected will generally flow downwardly and be discharged from the bottom edge of the panel. Side flanges are also provided with this guard to minimize lateral outward flow of any water that is collected on the panel and may be induced by air currents.

The structures disclosed in the several patents noted in the preceding paragraphs demonstrate the underlying and basic problems associated with the air entrained water droplets and mist generated by the vehicle wheels. As previously noted, this problem is control of not only the water droplets, but also the relatively fine mist that is generated and which has a greater tendency to remain entrained in the air and be carried along with that air and remain airborne. These patents clearly indicate that the previously attempted solutions were not only a mechanism for collection of the water that is entrained in the air flow generated by the revolving vehicle wheels, but a directive control as to the flow of that collected water to reduce its likelihood of again becoming airborne and continuing to produce the hazardous visibility problem to adjacent and following vehicles with respect to any particular automotive vehicle. However, none of these prior attempts to solve the problem indicated any combination of techniques and the effectiveness of the prior art splash guards has been less than desired.

SUMMARY OF THE INVENTION

A spray controlling system is provided by this invention for utilization with automotive vehicles, and in particular, for use with the larger type of vehicles such as trucks and tractor/trailer combinations. The system provided by this invention includes a splash guard of unique and novel design and side guards where appropriate for positioning on the vehicle in operative relationship to sets of wheels of either the truck or of a trailer. The splash guards are formed from a material having an inherent resilient flexibility and provided on a front surface thereof with a spray controlling surface conformation. The guard being a relatively thin sheet-form panel may also be advantageously provided with stiffening elements in the form of strips of sheet metal which are integrally molded into the panel to reduce the ability of that body to flex in high velocity air streams and thus resist being flexed to a position where it would be substantially ineffectual for its intended purposes. The side guards comprise elongated panels of a suitable material and provided with mounting devices for securing of these panels in longitudinally extending relationship to the body or truck bed. These panels are located in co-extensive relationship to the respective wheel sets and have a vertical dimension sufficient to extend downwardly from the bottom surface of the truck bed or body to a point slightly below the top portions of the wheels.

The side guards are also of a length to preferably extend forwardly of the front part of a wheel and terminate rearwardly in association with the splash guard that extends transversely of the vehicle and is disposed at the rear of the wheel set. In the case of utilization of the splash guard of this invention for the steered wheels, such guard may be mounted without the side guards in view of the fact that an integral fender structure is often provided that is adequate for side spray control. However, in those instances where the fender structure of the vehicle itself is inadequate, suitable side guards may also be provided in association and cooperative relationship to the splash guards.

The splash guard of this invention as indicated, is formed from a sheet of material to have a sheet-form panel on which a surface thereof disposed in facing relationship to the wheels is provided with ribs and finger-like projections for effecting collection of airborne water droplets and mist and to direct the flow of the collected water. It is also provided with upstanding ribs for channelling of the collected in water in predetermined flow paths for subsequent discharge toward the surface of the pavement or roadway. The side guards may also be provided with mechanisms for enhancing collection of water as well as providing flow direction to water that is thus collected. As in the case of the splash guards, the side guards are also designed to induce a flow of the water as well as the air currents associated therewith in a downward direction to cause the collected water to be discharged in the direction of the roadway and thereby reduce its tendency to otherwise be lifted further into the air where it could be dispersed laterally with respect to the vehicle at an elevation to present a hazard to passing vehicles.

The specific surface conformations applied to the sheet-form panel of the splash guard comprise, in the basic form of the invention, a plurality of projections arranged in transversely extending, spaced parallel rows. These projections are of a finger-like configuration such as for example, conical projections which are integrally formed at their base with the surface of the splash guard panel. These projections, in the respective rows, are arranged in relatively closely spaced relationship to each other and thus define a substantially continuous rib to enhance the ability of the components in directing a flow of collected water tranversely across the face of the guard body. Adjacent rows of these projections are spaced a predetermined distance apart and thus cooperatively define a flow channel for this collected water. In the preferred form of the invention, these rows of projections are disposed in angled relationship to a vertical axis of the guard and are formed in two sets with each set being disposed at a respective side of a vertical center line of the guard body panel. The angled orientation of these rows of projections are such that they are inclined downwardly and outwardly with respect to the vertical center line, and thus, effect a flow of collected water laterally outward toward the vertical side edges of the panel.

In the preferred form of the invention, a plurality of flow directing ribs are also provided. These ribs, which project in upstanding relationship to the surface of the splash guard body panel, extend in a generally transverse direction across the face. Also, these ribs are disposed in angled orientation with respect to a vertical center line of the panel and are inclined in a downward and outward direction with respect to that center line. The number of the flow directing ribs is substantially less than the rows of projections and in the illustrative embodiment, six rows of projections are interposed between each adjacent pair of flow-directing ribs. These ribs are also spaced a predetermined distance from the adjacent row of projections, and thus, form a flow channel between the rib and projection row for the collected water. Also, the height of the ribs is substantially greater than the height of the projections to better aid in channelling water flow.

The splash guard is also advantageously provided with side flanges which extend vertically along each of the vertical sides of the panel. These flanges extend a substantially greater distance outwardly with respect to the surface of that panel than the flow-directing ribs and projections. Each of the side flanges is also spaced a distance laterally outward with respect to the terminal ends of the rows of projections and flow-controlling ribs. This space thus forms a vertical channel for receiving the laterally flowing water and then directing that flow vertically downward where it is discharged from the lower end of the panel in the direction of the roadway surface.

As to the general structure of the splash guard, it is formed with a header at its upper end which provides a means for mechanical attachment and securing of the guard in suspended relationship to the bottom frame structure of a vehicle. The panel itself is preferably formed from a suitable material such as rubber having a desired degree of resiliency and thus each of the components forming the spray controlling surface conformations are also formed from a resilient material. Although the panel is provided with flanges at the extreme side edges that tend to increase the rigidity of the panel, it is preferred to also incorporate additional stiffening elements within the panel. These additional stiffening elements may be in the form of flat strips of steel which are less flexible than rubber and thus, when positioned in vertically extending relationship and spaced relationship to each other in the body of the panel, reduce its ability to flex under the influence of strong air currents. These strips also do not extend the full length of the guard, but terminate a distance vertically above the bottom edge of the guard to thereby enable that portion to be flexed to a substantially greater degree and enable it to accommodate upstanding obstructions that may be encountered on the roadway surface during certain maneuvering operations of the vehicle such as when approaching and departing loading docks.

These and other objects and advantages of this invention will be readily apparent from the following detailed description of an embodiment thereof and the accompanying drawings illustrating a preferred embodiment of the splash guard.

DESCRIPTION OF THE ILLUSTRATIVE EMBODIMENT

Figure 1:
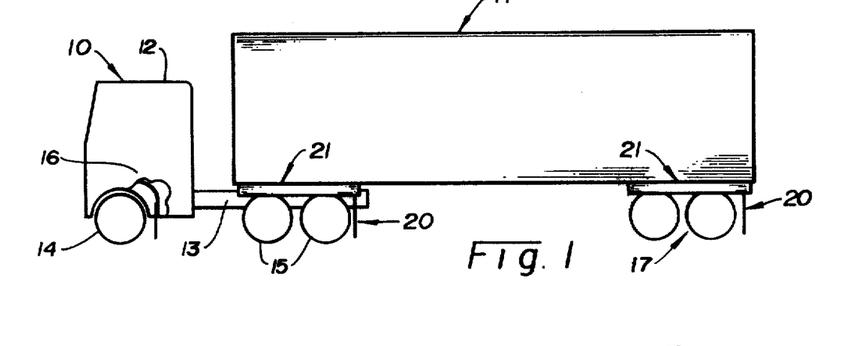
FIG. 1 is a side elevational view of an automotive vehicle of a tractor and trailer combination type provided with a spray controlling system embodying this invention.

Referring to FIG. 1 of the drawings, there is illustrated a tractor and trailer combination of the type with which the spray controlling system of this invention is particularly adapted to be utilized. That tractor/trailer combination includes a tractor 10 and a semi-trailer 11. The tractor 10 comprises a cab 12 mounted on a chassis 13 which is supported by a set of steered wheels 14 and a tandem set of drive wheels 15. In a tractor type structure such as this, the cab 12 also generally incorporates a fender structure 16 which forms a partial side shield and guard with respect to the steered wheels 14. Usually, the set of drive wheels 15 are not provided with any fender structure. The semi-trailer 11 is carried at its front end on the tractor 10 with the rear portion being carried on a tandem set of trailer wheels 17. As is the case with the drive wheels of the tractor, the trailer wheels 17 are also generally not provided with any specific fender structure.

While a tractor and semi-trailer combination is shown as a utilization vehicle for the spray controlling system of this invention, such a specific vehicle is not considered a limitation on the adaptation and use of such systems. For example, it is contemplated that a full trailer type vehicle may also be provided with the system. Similarly, a truck type unit wherein the cargo or load carrying body section is mounted on the truck chassis can also be provided with the system. Furthermore, it will be noted that the vehicle may be provided with single axle wheel sets rather than the illustrated tandem sets and that the particular wheel sets may be of a single wheel type rather than the illustrated dual wheels. A single axle and single wheel arrangement is illustrated by the steered wheels 14 in FIG. 1.

In accordance with this invention, the spray controlling system with respect to a wheel set includes in its basic form, a splash guard 20 and in a more complex form, a side shield 21, with these components and their location on the vehicle being shown in FIG. 1. The basic system of a splash guard 20 comprising a sheet-form structure which is adapted to be suspended in a vertical position a distance rearwardly of a wheel is indicated with respect to the steered wheel 14. The more complex combination of the splash guard 20 and a side shield 21 is illustrated with respect to the set of drive wheels 15 and the set of trailer wheels 17. Since the structure of the splash guard 20 in accordance with this invention is substantially the same regardless of whether it is utilized with respect to the steered wheels or the tandem drive or trailer wheels, other figures illustrating the combination are directed to a single set of wheels which are shown as a dual wheel arrangement.

Figure 2:
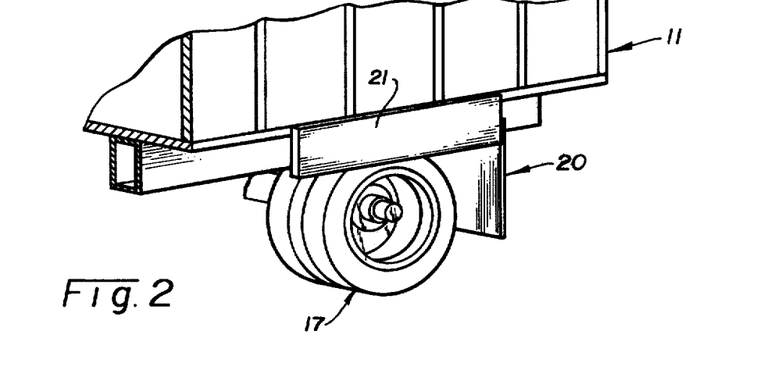
FIG. 2 is a fragmentary perspective view of a rear portion of the trailer on an enlarged scale and showing one of the tandem wheel sets of the trailer provided with the system of this invention.
Figure 3:
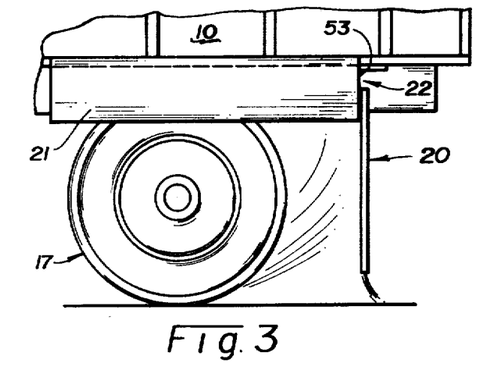
FIG. 3 is a side elevational view of the fragmentary portion of the vehicle shown in FIG. 2, but on a further enlarged scale.
Figure 4:
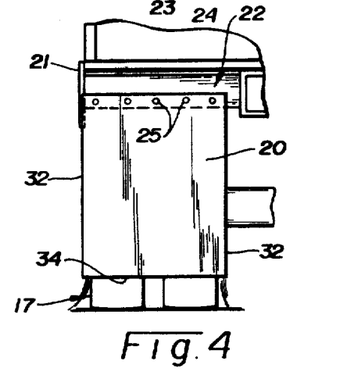
FIG. 4 is a fragmentary rear elevational view of the vehicle as seen from the right side of FIG. 3.

Referring to FIGS. 2, 3 and 4, other details of a guard construction and its mounting on a vehicle will be more readily seen. In these figures, it will be seen that the side shield 21 comprises an elongated panel having a relatively small vertical dimension and which is adapted to be mounted on a bottom corner of the trailer body. This side shield is of a length to extend at least the total length of the wheel set, or combined set of wheels in a tandem arrangement, and preferably, extends a distance forwardly of the front of the wheels and also extends a distance rearwardly of the rear of the wheels. As indicated in the drawing figures, the side shield most advantageously extends a distance rearwardly to at least coincide with the splash guard 20.

As indicated, the splash guard 20 comprises a sheet-form panel of a generally rectangular shape which, in the case of the truck or trailer type installation, has a substantial vertical extent as compared to its transverse width. The width is determined primarily by whether the wheel set is a dual or single wheel type and preferably has a transverse dimension to extend laterally outward with respect to the longitudinal sides of that particular wheel set. This width relationship can be best seen in FIG. 4. Mounting of a sheet-form panel of the splash guard 20 is accomplished by mechanical fastening devices interengaging with the uppermost end portion of the guard and interfitting with a mounting member 22. In FIGS. 2, 3 and 4, this mounting member 22 which is on a semi-trailer 11 may comprise a rigid steel angle-bar having one flange 23 secured to the bottom floor of the trailer. The other flange 24 extends vertically and overlaps with the upper header portion of the splash guard with a series of bolts 25 extending through the co-extensive portions and securing the guard to that mounting member. This particular mounting is considered to be illustrative as other structures may be employed as determined by the particular vehicle configuration. For example, a slightly different type of mounting member or bracket may be required in the case of the set of drive wheels 15 and also in association with the steered wheels 14.

Figure 5:
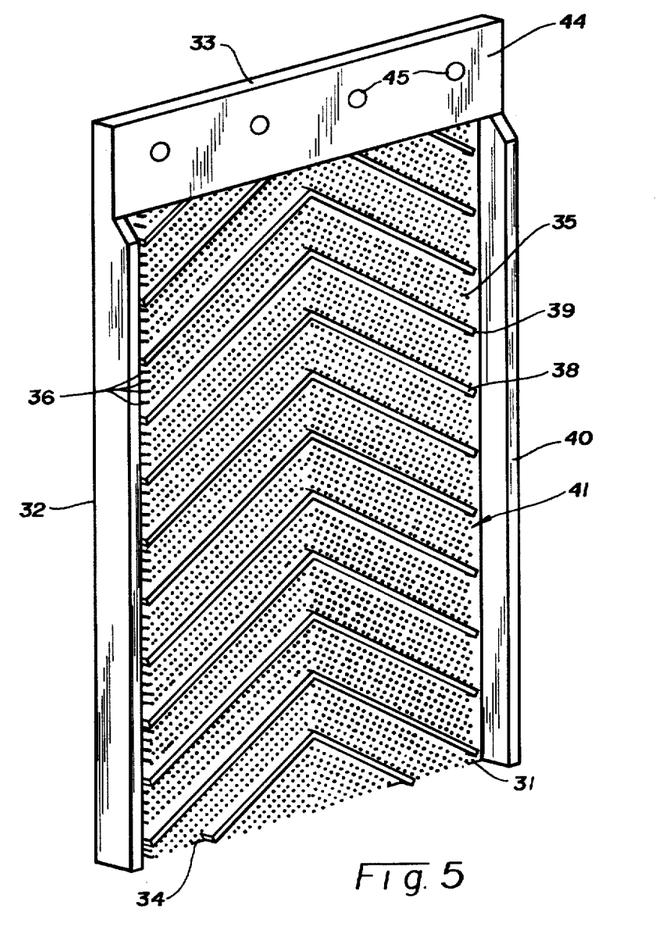
FIG. 5 is a perspective view on an enlarged scale of the front face of a splash guard embodying this invention.
Figure 6:
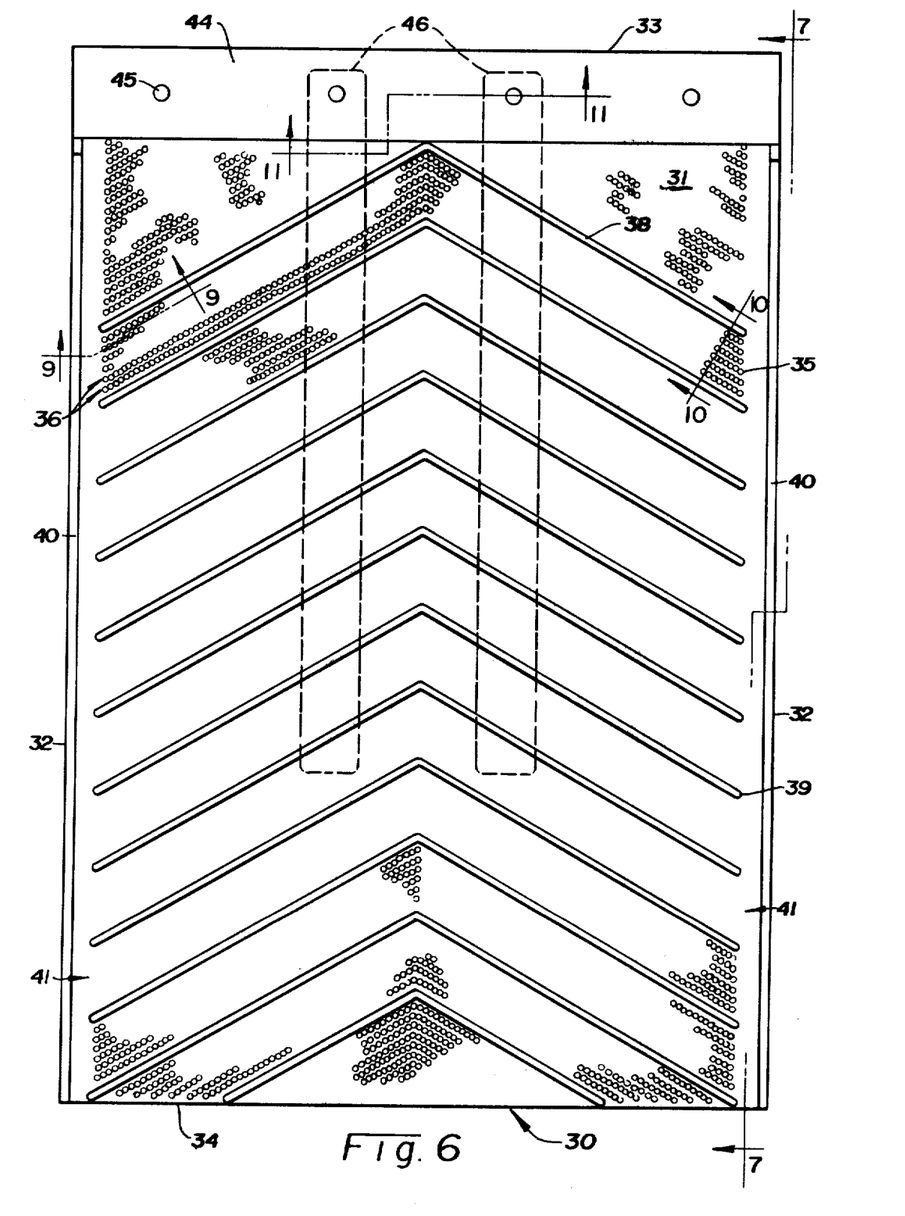
FIG. 6 is a front elevational view on a further enlarged scale of the spray controlling surface of the splash guard of FIG. 5.
Figure 7:
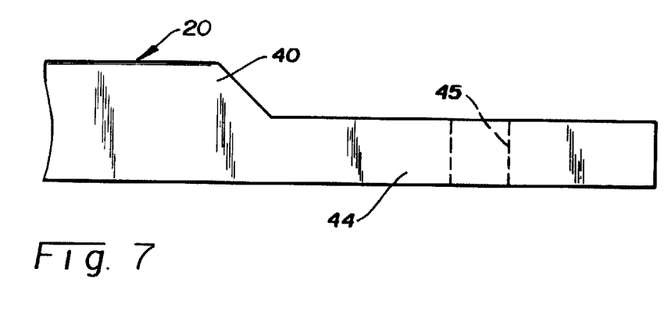
FIG. 7 is a vertical sectional view taken along line 7—7 of FIG. 6.
Figure 8:
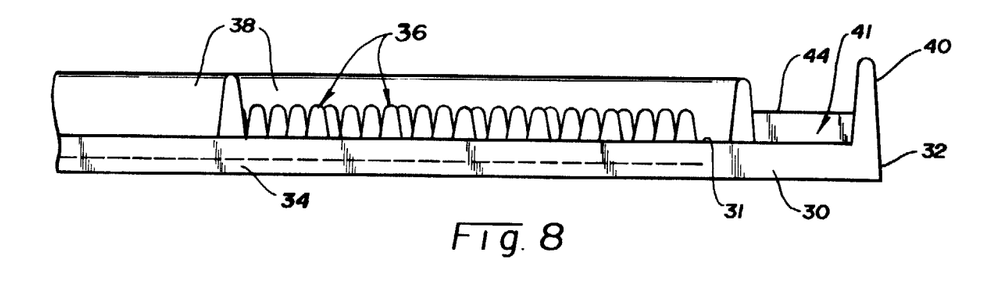
FIG. 8 is a fragmentary bottom end view on an enlarged scale of the right side of the guard as seen in FIG. 6.
Figure 9:
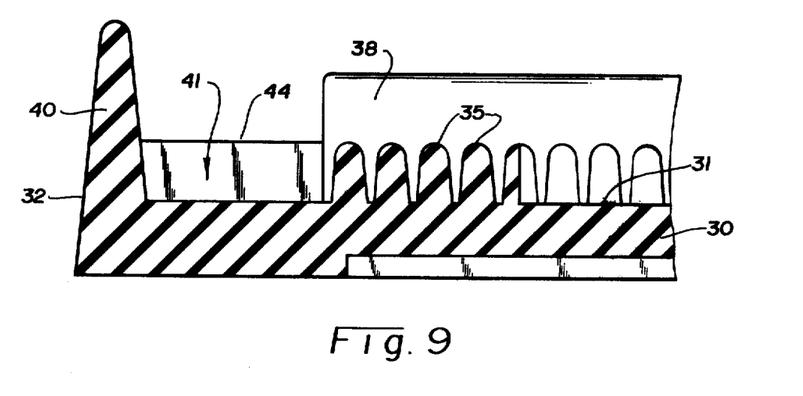
FIG. 9 is a fragmentary sectional view on an enlarged scale taken along line 9—9 of FIG. 6.
Figure 10:
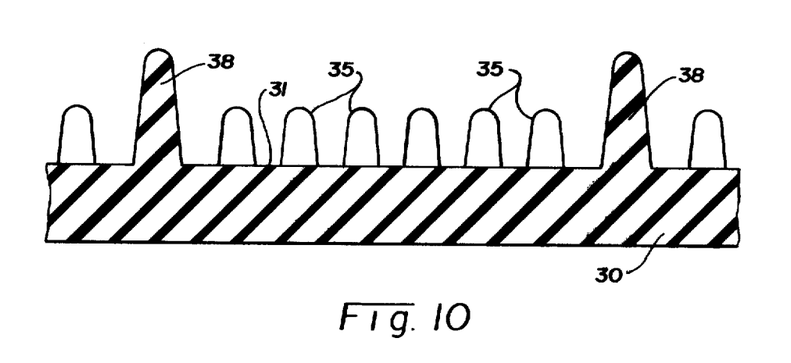
FIG. 10 is a fragmentary sectional view on an enlarged scale taken along line 10—10 of FIG. 6.
Figure 11:
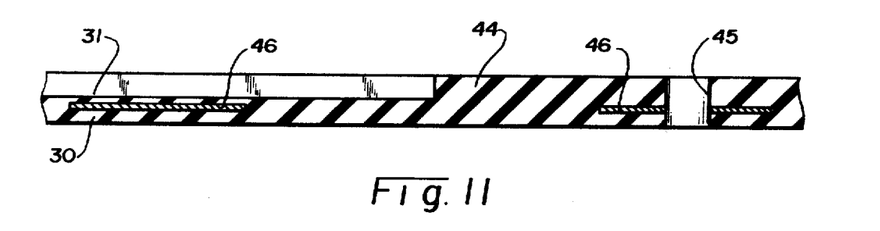
FIG. 11 is a fragmentary sectional view on an enlarged scale taken along line 11—11 of FIG. 6.

In accordance with this invention, the splash guards 20 comprise a sheet-form panel 30 which includes a surface 31 that is adapted to be disposed in facing relationship to the rear of a wheel with which the guard is designed to function. This panel 30 is of a rectangular configuration and has vertically extending side edges 32 and transversely extending top and bottom edges 33 and 34. This particular construction of the splash guard 20 is best seen in FIGS. 5-11. FIGS. 5 and 6 provide an overall front view of the guard and the particular components thereof that enhance its performance and function as a splash guard in collecting water and routing the collected water to a desired discharge point.

The functioning of the splash guard of this invention to not only collect water which is in the form of large droplets but also in a fine mist, is effected by a spray controlling surface conformation that is formed on the surface 31 of the panel. This surface conformation basically comprises a plurality of projections 35 which are of a configuration and relatively oriented to effect the dual functions of collecting the airborne water that is thrown by the vehicle wheels and to then direct the flow of that collected water to a point on the surface 31 of the splash guard panel 30 where it may be most advantageously discharged and will not result in hinderance and obscuration of the vision of drivers of either following vehicles or those immediately adjacent the side of the vehicle in a passing position. In the illustrative preferred embodiment of FIGS. 5–10, these projections 35 are of a finger-like configuration which are generally conical with the bases thereof secured to the surface 31 of the guard panel 30. The particular configuration and relative dimensioning of those projections can be best seen in FIGS. 9 and 10.

The panel 30, which is formed from a material such as rubber having a desired degree of resilient flexibility, has a thickness of the order of 0.8 centimeters (0.325 inches) with each of the projections having a relative height of 0.65 centimeters (0.25 inches) and a base diameter of 0.4 centimeters (0.165 inches) with a height to base dimensional ratio of the order of 1.5. Each of these projections is also formed with a draft angle of the order of 6 degrees which provides a reasonable angle for readily permitting removal of the guard from a mold. These projections 35 are arranged in a series of rows 36 disposed in spaced parallel relationship. This arrangement can be best seen in FIG. 6 wherein it will also be noted that these projections are aligned on a perpendicular axis as between the several rows.

The spacing of the projections in each row is relatively small with the center spacing being of the order of 0.45 centimeters (0.18 inches). With the specific base diameter dimension, this results in an interspacing of the projections in the rows at their respective bases a distance of the order of 0.04 centimeters (0.02 inches). This relatively close spacing of the projections results in their effectively functioning as a continuous wall for effecting a channeling of water flow between adjacent rows. With the relative spacing of the rows of projections 36 being substantially greater and of the order of 0.8 centimeters (0.312 inches) on a center to center spacing, it will be seen that adjacent pairs of rows of projections form channels for the flow of water. With the specific projection base and height dimensions, this results in a projection height to base spacing ratio of the order of 1.7. Referring specifically to FIGS. 5 and 6, it will also be noted that these rows of projections 36 are disposed on the surface 31 of the panel 30 in angled relationship to a vertical center axis of the panel. In effect, the projections are arranged in two distinct sets with respect to that center line and each set is oriented at an included angle of the order of 60 degrees with respect to the vertical axis or 30 degrees relative to a transverse horizontal axis of the guard. These rows extend in a relatively downwardly and outwardly inclined direction with respect to the vertical center axis and thus the flow directing channels formed by the adjacent pairs of projections will effect a flow of collected water laterally outward on the surface of the guard panel toward the opposed vertical side edges thereof. The objective of this arrangement of projections is to not only effect that desired collection of the water that is caused to be airborne by functioning of the vehicle wheel, but to then direct that collected water in a downward and outward flow to the sides of the guard.

Directing the water in this manner thus removes that water from a position immediately rearward of the vehicle wheels and, as will be subsequently described, result in discharge of that water in a direction toward the roadway or pavement on which the vehicle is travelling at a point which is laterally outward of the vertical sides of the wheel or wheel sets.

To further enhance the capability of the splash guard of this invention to direct a flow of the collected water laterally outward with respect to the surface 31 of the panel, a series of flow-directing ribs 38 are also provided. The ribs 38 are disposed in pairs that are interconnected at the vertical centerline of the guard, but are not connected to other structures at their outer terminal ends 39. These ribs are also arranged in spaced parallel relationship and comprise upstanding, elongated bars having tapered side walls that are disposed in parallel relationship to the rows of projections. The taper of these side walls is also of the order of 6 degrees, thus forming a preferred draft angle that facilitates removal of the guard from a mold. In the illustrative embodiment, the flow-directing ribs are spaced apart a distance of the order of 5.1 centimeters (2 inches) and thus adjacent pairs of these ribs include six rows of the projections 35. Each of the ribs 38 is also relatively spaced from an adjacent row of projections on a center-to-center spacing of 0.9 centimeters (0.35 inches), thus leaving a bottom spacing of the order of 0.4 centimeters (0.156 inches) and defining a water flow channel therebetween. Each of these ribs is also of a relatively greater height than the projections 35 with these ribs in this illustrative embodiment being of the order of 1.3 centimeters (0.5 inches) and having a base width of the order of 0.55 centimeters (0.215 inches). The ratio of the rib height to the projection height is advantageously of the order of 2 with the rib height to base width ratio being of the order of 2.3. It will also be noted that these ribs 38 are oriented in the same angular relationship as the rows of projections 36 with respect to the vertical center line axis of the guard and each is of substantially the same length as the respective rows of projections. Substantially the entire surface 31 of the panel is provided with these rows of projections 36 and flow-directing ribs 38 which, as can be seen in FIGS. 5 and 6, are formed in a repetitive pattern.

A splash guard 20 designed for use with the dual wheels of an axle set has a nominal total width of 60 centimeters (24 inches) and in the illustrative embodiment has an effective vertical surface height of the order of 84 centimeters (33 inches). Thus, the rows of projections 36 and the flow-directing ribs 38 terminate a distance laterally inward with respect to the vertical side edges 32 and have a longitudinal length of the order of 32 centimeters (12.6 inches) with respect to the vertical center line of the guard. This length has been found to not exceed the length for which the ribs 38 or the rows of projections 36 having the previously indicated dimensions will be effective for causing a lateral flow of water, that is, a ratio of projection row length or rib length to respective height in the range of 25-50. Lengths that are greater than this amount have a tendency to permit the water to flow downward and over the top of the ribs or projections to a greater extent than they can fully direct the flow laterally to the extreme outer ends of the projections or ribs. For the single wheel sets such as the steered wheels, the guard does not need to be formed with this transverse dimension and for a truck type wheel, a transverse width of the order of 36 centimeters (14 inches) has been found entirely sufficient. With that particular dimension, the relative length of the ribs and projections is proportionately decreased to result in termination of those rows and ribs a distance inwardly of the vertical side edges of the guard.

As previously indicated, one important objective of the configuration of the spray controlling surface conformation of the guard is to cause a flow of collected water in a downward direction for subsequent discharge toward the pavement or roadway. This function is accomplished by providing vertically extending side flanges 40 at each respective side of the panel 30. Each of these flanges 40 projects a distance outwardly from the panel surface 31 a distance of the order of 1.75 centimeters (0.7 inches) and has a base width of the order of 0.85 centimeters (0.336 inches). These flanges are also spaced a distance laterally outward with respect to the terminal ends of the projections 35 and the terminal ends 39 of the ribs. This lateral spacing is of the order of 1.9 centimeters (0.75 inches) and thus results in the formation of a vertically extending water flow channel 41. The objective of having the flange 40 of a relatively greater heighth than either the flow directing ribs 38 or the projections 35 is to better enable those elements to cooperate in confining the collection of the water to the front face of the guard.

For attachement of each of the splash guards 20 to the vehicle, these guards are provided at their uppermost ends with a header or mounting edge 44. For the illustrative size guard which is of an overall dimension of 60 centimeters by 92 centimeters (24×36 inches) this header flange has a vertical heighth of 8.25 centimeters (3.25 inches). Also, the header is of a relatively greater thickness than the panel of the guard and in this embodiment, is 1.3 centimeters (0.5 inches). It is also advantageous to form the header as an integral part of the panel 30. To facilitate attachment by means of the bolts 25, four holes 45 are formed centrally in a transverse direction across the header. These holes may be of the order of 1.3 centimeters (6.5 inches) in diameter and are relatively spaced apart a distance of the order of 5.25 centimeters (6 inches).

It is also essential that the flexibility of the guard be substantially limited to a predetermined degree. This is termed the anti-sail feature which is required by many state or national vehicle safety regulations or codes. The obvious purpose is that a splash guard which, because of the velocity of the air as a consequence of the speed of the vehicle, tends to be blown rearwardly and upwardly and becomes substantially less effective. With a splash guard of this invention, it is also important to reduce that capability of rearward flexing at higher rates of speed in order that the guard will remain more effective in its function of collecting the water and then directing the flow of water downwardly for discharge to the pavement. Accordingly, as is the prior practice with other type of guards for truck-type vehicles, a pair of stiffening plates 45 are integrally molded into the panel and the header. Two of these stiffening plates 45 are shown provided with a guard as can be best seen in FIGS. 6 and 11 with each plate being positioned to circumscribe a respective one of the mounting holes 45. These plates are preferably formed from a spring steel having a thickness of the order of 0.178 centimeters (0.07 inches) and a width of the order of 5.1 centimeters (2 inches). They are essentially disposed in a central position with respect to the front and rear surfaces of the panel and extend downwardly from the top of the guard for a distance of the order of ⅔ of the vertical extent of the guard. This leaves the bottom portion of the guard relatively more flexible, but because of the limited extent and the bottom location of this more flexible portion, the guard will not be flexed to such an extent as to become ineffective for its intended function of collecting water and subsequently directing the flow of that water laterally and downwardly. A further advantage of this flexible characteristic of the lower portion of the guard is that the guard will more readily accommodate obstacles that may be encountered during the operation of the vehicle such as in backing of the vehicle adjacent to loading docks and curb sections. The guard will have a tendency to better flex and avoid being broken.

Functioning of the splash guard 20 of this invention can be best seen by further reference to FIGS. 2, 3 and 4 of the drawings when considering the structural characteristics of the guard. A vehicle which is traversing the roadway at a relatively high speed will result in the guard having a slight rearward deflection. This is diagrammatically indicated in FIGS. 2 and 3. Also diagrammatically indicated in FIGS. 2-4 is the effect of the revolving wheels in picking up water that is normally deposited as a layer or film on the roadway and causing that water to become droplets or a mist that is airborne and as a consequence, will be effectively carried rearwardly and upwardly with respect to the vehicle. As the water droplets and spray mist impinge upon the panel 30, they will encounter the spray controlling surface conformations. In this instance, the airborne water droplets and mist will tend to collect in the spaces between the projections 35 and rows of projections 36 as any rebounding effect of the water through contact with the surface 31 at the base of those projections and flow directing ribs 38 will result in the water again very likely contacting the surfaces of those projections and ribs. Consequently, the water that is thrown against the surface 31 of the guard will tend to collect on that surface and, as it builds up, will by gravitational effect, flow downwardly and laterally outward along the upper surfaces of those rows of projections 36 and the flow directing ribs 38. By having the rows of projections 36 and ribs 38 formed in a chevron or inverted V configuration, the downward flow of water will be effectively controlled by those projections and ribs and result in the water that has been collected on the effective collecting surface 31 being discharged laterally outward into the water flow channels 41. At this point, the outwardly directed flow is intercepted by the side flanges 40 and result in diverting of the water in a downward manner through those water flow channels. At the bottom edge 34 of the guard, the water will be discharged from the respective channels 41 in a downward direction toward the roadway. This is also illustrated in FIGS. 2-4 of the drawings wherein the downward water flow as it is discharged from the guard appears as a rope-like configuration. A particular advantage of this functional operation of the side flanges and side water flow channels is that a sufficiently large quantity of water is accumulated and forms a free flowing, self-contained water body that does not readily disperse agains into either water droplets or a spray mist. Reducing the ability of the discharged water to again from droplets or a mist significantly enhances the ability of the guard to prevent subsequent reformation of that spray where it may again become entrained in the airflow and be carried upwardly into regions where it would very likely again interfere with the visibility of drivers of following or passing vehicles.

A further advantage of the particular configuration of the projections 35 and the ribs 38 in combination with the flexible characteristic of the panel is the greater ability of the guard to prevent formation of ice or mud layers that would tend to defeat the functioning of the guard. The projections, as well as the ribs, are formed with a slight draft angle which is not only necessary to effect molding of a rubber article, but that configuration results in an inherent ability of the guard to eject the materials of a solid nature such as dirt particles in the form of a mud or slush as well as water that may become collected or frozen in the spaces between the projection, ribs and flanges. The flexing characteristic of the guard, and the guard will be continually flexed during normal operations as a consequence of varying air currents and vehicle speeds, results in an effect similar to that of the ice cube trays of the pop-out type.

Figure 12:
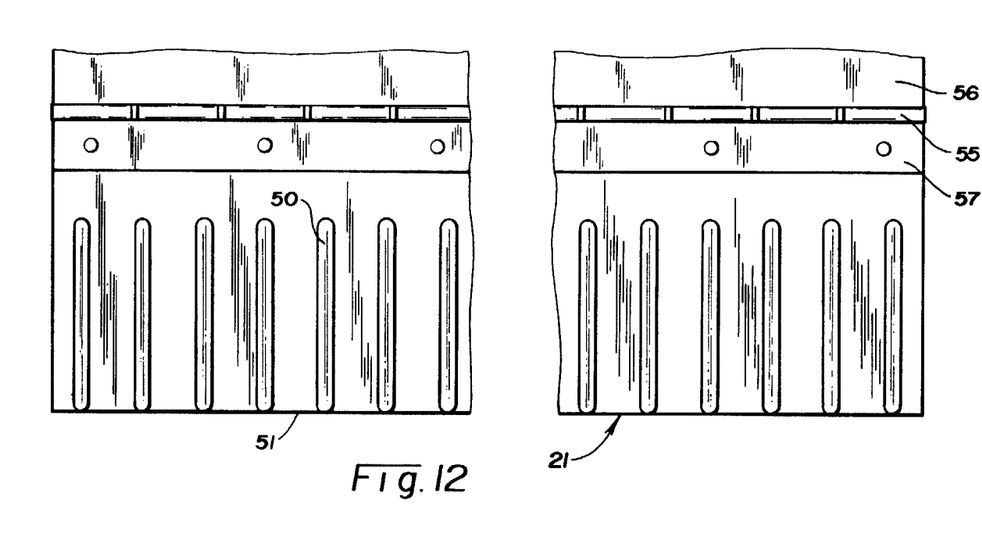
FIG. 12 is a fragmentary elevational view on an enlarged scale of the inner surface of a side shield.
Figure 13:
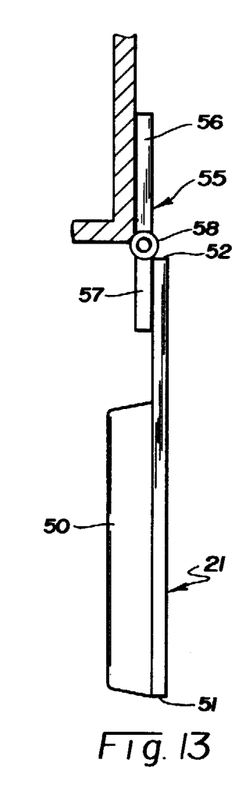
FIG. 13 is a side elevational view on an enlarged scale of the right end of the shield as seen in FIG. 12.
Figure 14:
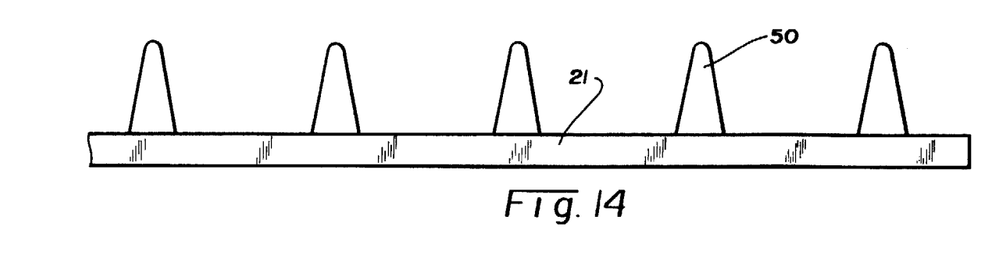
FIG. 14 is a fragmentary bottom edge view on an enlarged scale of the side shield.

To form a more complete spray controlling system as previously noted, side shields 21 are also positioned on the vehicle adjacent and in combination with the splash guards 20. A specific structural embodiment of a side shield fabricated in accordance with this invention is illustrated in FIGS. 12-14. FIG. 12 is a elevational view of the interior or inwardly facing surface of a typical side shield. The drawing illustrates only a fragmentary portion of such a shield to better illustrate the surface conformation that enhances the control of water spray. These shields may be constructed in a single unit in the case of a relatively short length that is required for a single axle set or they may be constructed in multiple units that are interconnected longitudinally with respect to each other by suitable means to form a unitary structure. The particular technique of either unitary fabrication or plurality of similar units is not a matter of consequence of this invention.

Control of water spray at the side of the vehicle presents a slightly different problem than that associated with the rear of the wheels and which is effectively controlled by the splash guard 20 of this invention. The water spray generated by the wheels is carried upwardly to the extent that it will be thrown against the bottom surface of the vehicle or van body. At this point, that spray may break up into a smaller droplet size and thereby increase the amount that is in mist form. Included in this mist will be a quantity of relatively large water droplets as in the case of the rearward directed water spray. Airflow, however, with respect to the side of the vehicle, tends to carry this spray laterally outward and upwardly with respect to the roadway. Consequently, the function of the side shield is to contain the water either in the droplet or fine mist form to the immediate vicinity of the vehicle and preferably adjacent to the side thereof. Accordingly, the side shields are formed with an interior surface having a series of vertically extending and longitudinally spaced parallel ribs 50. It is desired that the side shield extend downwardly from the bottom floor of the van or body a distance such that the bottom edge 51 of the panel will be below the uppermost portions of the wheel. This is best illustrated in FIGS. 2 and 3 of the drawings. Each of the ribs 50 on the side panels extend approximately ⅔ of the distance upwardly from the bottom edge 51 and terminate in spaced relationship to the top edge 52. Accordingly, with a side panel having a nominal height of the order of 19 centimeters (7.5 inches) these ribs have a vertical length of 12.7 centimeters (5.0 inches). These ribs are also of a tapered cross-sectional configuration with a draft angle of the order of 10 degrees and have a height of the order of 1.9 centimeters (0.75 inches) and a base width of 0.95 centimeters (0.375 inches) with adjacent ribs being spaced apart a distance of the order of 3.8 centimeters (1.5 inches) resulting in a rib spacing to height ratio of the order of 2.

As previously indicated, the side shields 21 are preferably of a length to extend rearwardly such that a rear vertical edge 53 will be coextensive with the splash guard 20 as illustrated in FIGS. 2 and 3. While the side shield 21 need not be mechanically interconnected with the guard 20 along coextensive edge portions, it is preferred that these components be relatively positioned so that there is little space therebetween through which the water spray may flow. This constructional arrangement further enhances the ability of the combination to direct any rearwad flow of entrained water droplets and mist in a downward direction toward the roadway.

The functional effect of this side shield configuration is that the airflow generated by the vehicle wheels will not be substantially impeded and this airflow will then carry downwardly on the inside of those shields and adjacent the wheel in a direction toward the roadway surface. An advantage of this directivity control for the airflow is that it will tend to carry any entrained fine mist particles of the water in a downward direction to a location where they are not likely to interfere with a passing vehicle driver's vision or visibility as they will be at a level below the windows of even small passenger cars. Additionally, the water droplets and spray mist which impinge upon the inwardly facing surface of the side shield and collect thereon will tend to be directed downwardly by the vertically extending ribs 50. Thus, there is a combined effect of airflow control as well as water flow control to cause a greater proportion of the water droplets and spray mist to be directed downwardly toward the road pavement where it is not likely to interfere with other vehicle driver's visibility.

In the case of a semi-trailer 11, such as that illustrated in FIG. 1 of the drawings, the side shields 21 located at the rear of the trailer may be secured in fixed relationship to the van body by suitable fastening devices. However, such fixed positioning of the side shields is not appropriate with respect to the front of the semi-trailer. The reason is that during turning movement and particularly in the case of a tandem drive wheel set 15 of the tractor 10, such as that which is illustrated, there is a likelihood that the side shield 21 will contact one or the other of those wheels of the two axle sets. Consequently, it is preferred that the mounting with respect to the side shield at the front of a semi-trailer be by means of a hinge to permit lateral outward swinging of the side shield in the event that the shield should engage the top portions of the wheels. Mounting of the shields in this manner to permit such swinging movement will substantially prevent damage to the side shield which could otherwise occur.

Illustrative of such a structure is a hinge mount as indicated in FIG. 13 of the drawings. This hinge mount comprises an elongated hinged structure 55 which includes respective hinge plates 56 and 57. The one hinge plate 56 may be secured to the outer surface of the van body at its lowermost edge with the hinged pivot 58 thus extending parallel to and substantially coextensive with the lowermost corner of the van body. The opposite hinge plate 57 thus projects a distance downwardly and it is secured to the upper marginal edge of the side shield 21. With this mounting, it will be seen that as the wheels of the tractor engage the upper edges of the ribs 50, they will merely push against the side flange and swing it outwardly about its pivot 58.

As illustrated in the drawings, the front fender structure of the tractor is only shown as being provided with the splash guard 20. If desired and depending upon the specific construction of the fender and the wheel opening, it may be advantageous to also provide a side shield embodying a similar construction as that described with respect to the tractor drive wheels 15 or the trailer wheels 17.

It will be readily apparent from the foregoing detailed description of an illustrative embodiment of this invention that a particularly effective spray control system is provided for vehicles such as trucks and tractor/trailer combinations. The splash guard of this system is provided with a surface that is configured to both collect water that may be thrown upwardly by the wheels and to then direct the flow of that collected water in a manner that is highly effective in reducing the water spray that may be thrown upwardly and rearwardly of the wheels. Providing of both rows of projections and flow-directing ribs is extremely effective in effecting collection of water spray and directing the lateral flow of water to the side of the guard where the water is then discharged in relatively large, downwardly directed streams toward the roadway. The chevron orientation of the rows of projections and ribs contribute significantly to the lateral flow control. Utilization of this guard in combination with a side shield results in a combination that furher enhances spray control.

Having thus described this invention, what is claimed is:

1. A splash guard for automotive vehicles for controlling water spray generated by the wheels when traversing a moisture covered roadway comprising a sheet-form panel having a surface adapted to be disposed in vertically extending, facing relationship to a vehicle wheel, a vertically extending edge at each side of said panel surface, transverse bottom and top edges, and a spray controlling surface conformation formed on said panel surface, said spray controlling surface conformation including a plurality of projections fixedly positioned on said sheet-form panel in outwardly projecting relationship to said panel surface to collect water thrown against said surface, said projections being arranged in a plurality of elongated rows extending generally transversely across said panel with the projections in each row disposed in sufficiently closely spaced relationship to effectively form a water directing wall, each of said rows of projections disposed in spaced relationship to an adjacent row or projections to form in cooperation therewith a channel and extending in downwardly inclined relationship toward a vertically extending side edge whereby water collected in the channels between said rows of projections will be induced to flow transversely across said panel surface in a downwardly inclined direction toward a vertical side edge of said panel.

2. A splash guard according to claim 1 wherein said projections are of a finger-like configuration.

3. A splash guard according to claim 1 wherein said projections are of a conical configuration with their bases secured to said sheet-form body at said surface thereof.

4. A splash guard according to claim 2 or 3 wherein said projections are of the order of 0.6 centimeters in height.

5. A splash guard according to claim 4 wherein said projections are of the order of 0.4 centimeters in diameter at their bases.

6. A splash guard according to claim 5 wherein said rows of projections are spaced apart a distance of the order of 0.6 centimeters on centerline.

7. A splash guard according to claim 5 wherein said projections are relatively spaced apart in a row a distance of the order of 0.45 centimeters on center-to-center.

8. A splash guard according to claim 1 wherein the ratio of the height of the projections to the distance between adjacent rows at the base of the projections is of the order of 1.7.

9. A splash guard according to claim 1 or 8 wherein the ratio of the vertical height of said projections to their width at their bases in a direction transverse to the rows of projections is of the order of 1.5.

10. A splash guard according to claim 1 wherein said rows of projections are disposed in a predetermined angular orientation to a vertical axis of said panel.

11. A splash guard according to claim 10 wherein said rows of projections are disposed at an included angle of the order of 60 degrees with respect to a vertical axis of the guard.

12. A splash guard according to claim 1 wherein said spray controlling surface conformation also includes a plurality of elongated, flow-directing ribs fixedly positioned on said surface in outwardly projecting relationship thereto, said flow-directing ribs disposed in spaced relationship to each other and to adjacent one of said rows of projections, each pair of adjacently disposed flow-directing ribs having at least one row of said projections interposed therebetween.

13. A splash guard according to claim 12 wherein said projections are of a finger like configuration.

14. A splash guard according to claim 12 wherein the ratio of the height of said ribs relative to the height of said projections is of the order of 2.

15. A splash guard according to claim 12 wherein said projections are of the order of 0.6 centimeters in height and said flow-directing ribs are of the order of 1.3 centimeters in height.

16. A splash guard according to claim 15 wherein said projections are of the order of 0.4 centimeters in diameter at their bases and said flow-directing ribs are of the order of 0.55 centimeters in width at their bases, said rows of projections are spaced apart a distance of the order of 0.6 centimeters on centerline and each of flow-directing ribs is spaced from an adjacent row of projections a distance of the order of 0.88 centimeters.

17. A splash guard according to claim 12 wherein adjacently disposed pairs of said flow-directing ribs are spaced apart a distance of the order of 5 centimeters.

18. A splash guard according to claim 17 wherein six rows of projections are interposed between each adjacent pair of said flow-directing ribs.

19. A splash guard according to claim 12 wherein the ratio of the spacing of adjacently disposed flow-directing ribs to the height of said ribs is of the order of 4.

20. A splash guard according to claim 12 wherein the ratio of the height of the flow-directing ribs to the distance between a rib and a next adjacent row of projections is of the order of 2.5.

21. A splash guard according to claim 20 wherein the ratio of the height of the flow-directing ribs to the height of said projections is of the order of 2.

22. A splash guard according to claim 21 wherein the ratio of the spacing of adjacently disposed flow-directing ribs to the height of said ribs is of the order of 4.

23. A splash guard according to claim 12 wherein said sheet-form panel is provided on the surface thereof with first and second sets of rows of projections and flow-directing ribs with each set disposed at opposite sides of a vertical axis of said panel located a distance relatively inward of each of said vertically extending side edges, each of said sets having the rows of projections and flow-directing ribs disposed in predetermined angular relationship with respect to the vertical axis and inclined downwardly toward a respective vertically extending side edge.

24. A splash guard according to claim 23 wherein each row of projections and each flow-directing rib of each set is contiguous at said vertical axis with a respective row of projections or rib of the other set.

25. A splash guard according to claim 23 wherein said sheet-form panel includes an elongated, vertically extending side flange disposed at each side thereof in predetermined spaced relationship to the adjacent ends of a respective set of said rows of projections and said flow-directing ribs to form a vertical flow channel therebetween, each of said side flanges projecting a distance outwardly with respect to said panel surface.

26. A splash guard according to claim 23 wherein each of said rows of projections is of a length in the range of 15-35 centimeters.

27. A splash guard according to claim 23 or 26 wherein each of said flow-directing ribs is of a length in the range of 15-35 centimeters and is substantially equal in length to said rows of projections.

28. A splash guard according to claim 27 wherein said sheet-form panel includes an elongated, vertically extending flange disposed at each side thereof in laterally outwardly spaced relationship to the adjacent ends of said rows of projections a distance of the order of 3 centimeters.

29. A splash guard according to claim 28 wherein said sheet-form panel is formed in a width in the range of 35-62 centimeters.

30. A splash guard according to claim 29 wherein the vertical extent of the sheet-form panel surface having said spray controlling surface conformation formed thereon is in the range of 55-85 centimeters.

31. A splash guard according to claim 23 wherein the ratio of the rib length at one side of said vertical axis to the height of said rib is of the range of 25-50.

32. A splash guard according to claim 12 or 23 wherein said rows of projections and said ribs are disposed in a predetermined angular orientation to a vertical axis of said panel.

33. A splash guard according to claim 32 wherein said predetermined angular orientation is of the order of an included angle of 60 degrees.

34. A splash guard according to claim 1 wherein said sheet-form panel includes an elongated, vertically extending side flange, said side flange projecting a distance outwardly with respect to said panel surface and disposed in laterally spaced relationship to a adjacent end of each of said rows of projections to form a vertical flow channel therebetween.

35. A splash guard according to claim 34 wherein said side flange projects a distance of the order of 1.9 centimeters outwardly with respect to said panel surface.

36. A splash guard according to claim 35 having an elongated, vertically extending side flange formed with said sheet-form panel at the side thereof opposite said first mentioned flange.

37. A splash guard according to claim 1 wherein said sheet-form panel and spray controlling surface conformations are formed from a material having a predetermined degree of resilient flexibility.

38. A splash guard according to claim 37 wherein said sheet-form panel is provided with a transversely extending mounting header at an upper end thereof.

39. A splash guard according to claim 37 or 38 which includes at least one stiffening member extending vertically with respect to said sheet-form panel in mechanically coupled relationship thereto to reduce the flexing capability.

40. A splash guard according to claim 39 wherein said stiffening member extends downwardly from the upper end of said sheet-form panel and terminates a predetermined distance upwardly from the extreme bottom edge thereof.

41. A spray controlling system for use in association with an automotive vehicle wheel including in combination, a vehicle having a wheel set and a body structure associated therewith, a splash guard adapted to be mounted on said vehicle in rearwardly disposed relationship to the vehicle wheel set having a sheet-form panel having a surface adapted to be disposed in vertically extending, facing relationship to a vehicle wheel, a vertically extending edge at each side of said panel surface, transverse bottom and top edges, and a spray controlling surface conformation formed on said panel surface, said spray controlling surface conformation including a plurality of projections fixedly positioned on said sheet-form panel in outwardly projecting relationship to said panel surface to collect water thrown against said surface, said projections being arranged in a plurality of elongated rows extending generally transversely across said panel with the projections in each row disposed in sufficiently closely spaced relationship to effectively form a water directing wall, each of said rows of projections disposed in spaced relationship to an adjacent row of projections to form in cooperation therewith a channel and extending in downwardly inclined relationship toward a vertically extending side edge whereby water collected in the channels between said rows of projections will be induced to flow transversely across said panel surface in a downwardly inclined direction toward a vertical side edge of said panel, and a side shield adapted to be mounted on said vehicle in laterally outward disposed relationship to said wheel set, said side shield including an elongated panel depending from said vehicle body structure and forming an effective continuation thereof, said panel being of a length substantially greater than the longitudinal extent of said wheel set and of a vertical extent to project a distance downwardly to at least the top of said wheel set.

42. A system according to claim 41 wherein said side shield panel has a vertically extending surface disposed in inwardly facing relationship to the vehicle, said panel having a plurality of vertically extending flow-control ribs formed thereon and disposed to spaced parallel relationship.

43. A system according to claim 42 wherein said ribs are of the order of 19 centimeters in length and are of the order of 1.9 centimeters in height with adjacent ribs being spaced apart a distance of the order of 3.8 centimeters.

44. A system according to claim 42 wherein the ratio of the distance between adjacent flow-control ribs to the height of said ribs is of he order of 2.

45. A system according to claim 41 wherein said side shield and said guard meet at the rear of said splash wheel set.

46. A system according to claim 41 wherein said side shield is mounted on said vehicle by hinge means permitting relative swinging movement about a horizontal axis.

47. A system according to claim 41 wherein the spray controlling surface conformation on said splash guard includes a plurality of elongated, flow-directing ribs fixedly positioned on said surface in outwardly projecting relationship thereto, said flow-directing ribs disposed in spaced relationship to each other and to adjacent ones of said rows of projections, each pair of adjacently disposed flow-directing ribs having at least one row of said projections interposed therebetween.

48. A system according to claim 47 wherein said sheet-form panel is provided on the surface thereof with first and second sets of rows of projections and flow-directing ribs with each set disposed at opposite respective sides of a vertical axis of said panel located a distance relatively inward of each of said vertically extending side edges, each of said sets having the rows of projections and flow-directing ribs disposed in predetermined angular relationship with respect to the vertical axis and inclined downwardly toward a respective vertically extending side edge.

49. A splash guard according to claim 48 wherein each row of projections and each flow-directing rib of each set is contiguous at said vertical axis with a respective row of projections or rib of the other set.

50. A splash guard according to claim 48 wherein said sheet-form panel includes an elongated, vertically extending side flange disposed at each side thereof in predetermined spaced relationship to the adjacent ends of a respective set of said rows of projections and said flow-directing ribs to form a vertical flow channel therebetween, each of said side flanges projecting a distance outwardly with respect to said panel surface.

51. A splash guard according to claim 47 or 48 wherein said rows of projections and said ribs are disposed in a predetermined angular orientation to a vertical axis of said panel.

52. A splash guard according to claim 51 wherein said predetermined angular orientation is of the order of an included angle of 60 degrees.

53. A splash guard according to claim 41 wherein said projections are of a finger-like configuration.

54. A splash guard according to claim 41 wherein said projections are of a conical configuration with their bases secured to said sheet-form body at said surface thereof.

* * * * *